July 12, 1932.  G. DZAMAN  1,867,501
WOOD SURFACING MACHINE
Filed July 14, 1930   2 Sheets-Sheet 2
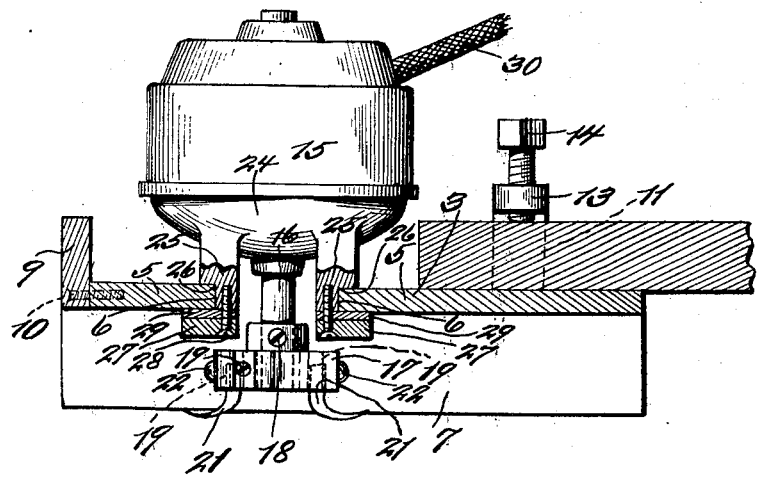
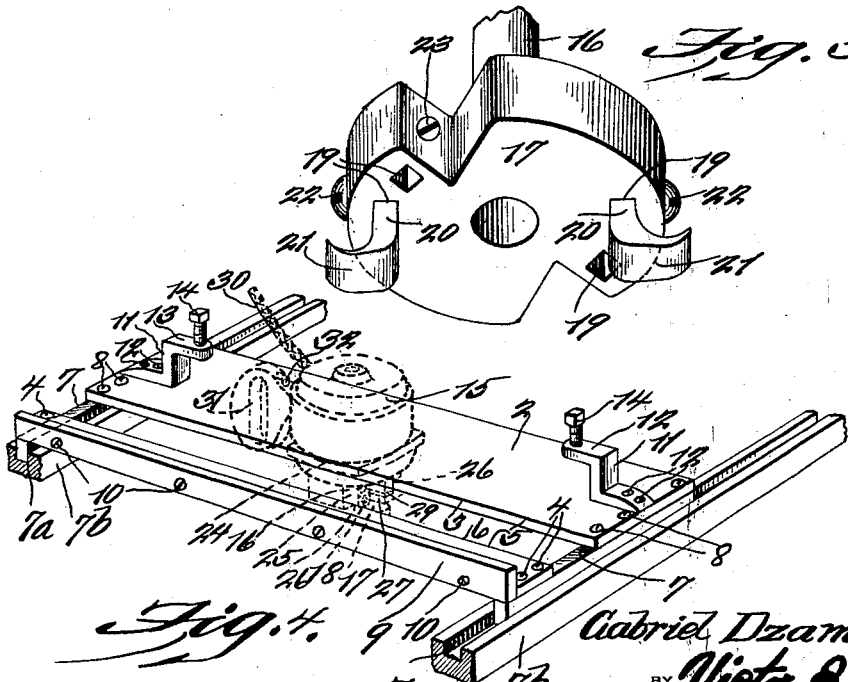
Gabriel Dzaman INVENTOR Patented July 12, 1932

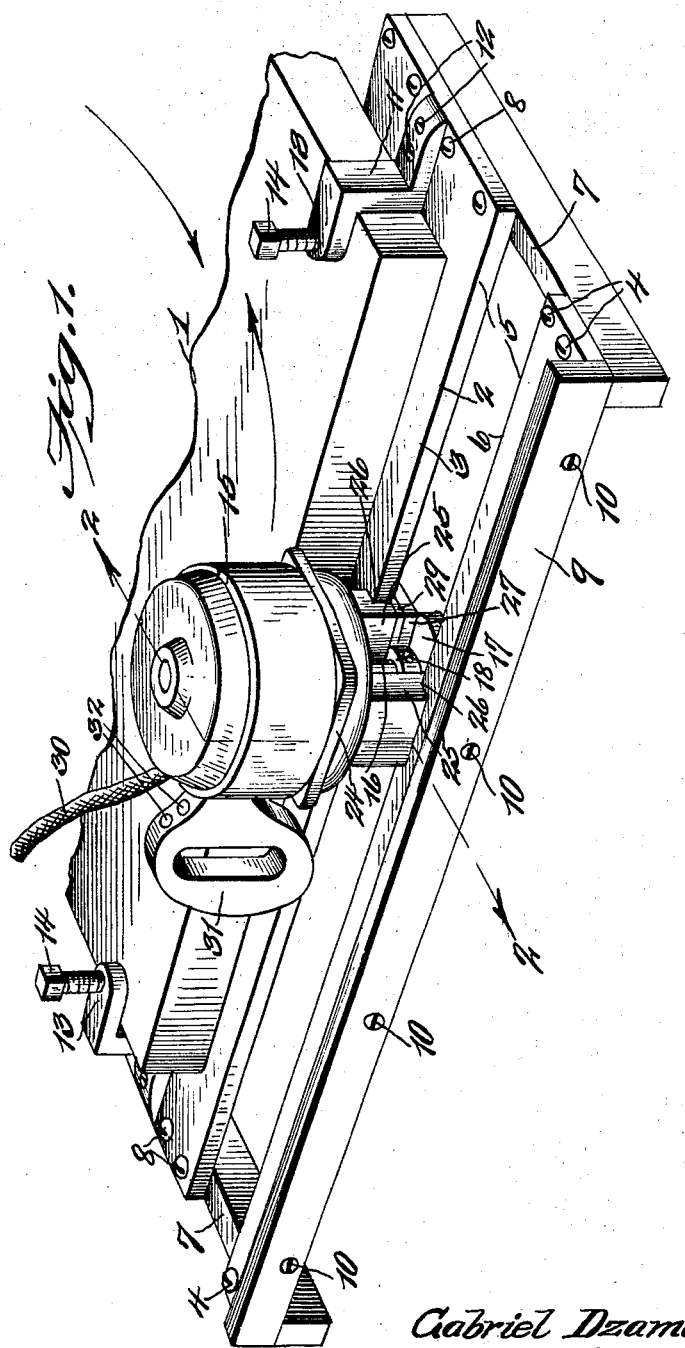

1,867,501

UNITED STATES PATENT OFFICE

GABRIEL DZAMAN, OF TRENTON, NEW JERSEY

WOOD SURFACING MACHINE

Application filed July 14, 1930. Serial No. 467,948.

The present invention relates to the art of wood working, and more particularly to an improved attachment for wood surfacing machines, such as those which are entitled "Clicker" type in commercial fields.

A purpose of the invention is to provide an attachment adapted for cooperative association with an arm, plate, or carriage, which is capable of a swinging or oscillatory motion over the material to be surfaced, said attachment comprising a frame having tracks, between and on which guides are mounted, for the support of a motor of some general or conventional type, the shaft of the motor carrying a tool head, the tools of which operate on the material to be surfaced, and by reason of the frame having the tracks, the motor and its guides can be moved longitudinally of the tracks as the arm or plate oscillates, so that the material can be properly surfaced throughout its entirety.

Another purpose is to provide an attachment of this kind wherein the frame, in addition to being capable of support on the oscillating arm or plate, can rest on the material, the face of which is to be surfaced. This use is possible due to the fact that the frame supports the surfacing tools of the rotating head, so as to engage properly with the material to be surfaced.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:

Figure 1 is a view in perspective of the attachment, as applied to an oscillating arm or plate of a "clicker" type of surfacing machine, though it can be applied to other types of machines.

Figure 2 is a sectional view on line 2—2 of Figure 1.

Figure 3 is a detailed view of the rotating head carried by the motor shaft, showing the surfacing tools.

Figure 4, a perspective view of a modified form of the wood surfacing machine showing the frame mounted on guide tracks.

Referring to the drawings, 1 identifies an arm or plate or carriage of a "clicker" type of wood surfacing machine, and which arm or plate is capable of oscillatory movements.

Carried by the arm or plate is a frame 2 comprising longitudinal pieces 3 and 4, the edges 5 of which are spaced in order to constitute tracks 6, which are in parallelism. In order to hold the pieces 3 and 4 in such positions, transverse bars or pieces 7 are secured by machine screws 8 to the pieces 3 and 4.

A suitable guard rail 9 rests on the ends of the transverse pieces 7 and is secured by machine screws 10 to one edge of the longitudinal piece 4.

Angle plates or brackets 11 are secured at 12 to the piece 3, and their arms 13 are so positioned as to overlie the oscillating arm or plate 1 of the surfacing machine, there being set bolts 14 threaded in the arm 13, to bear on the face of the oscillating arm or plate 1, thereby securely holding the frame in position. It is obvious that the frame 2 can be adjusted relative to the oscillatory arm or plate.

A conventional type of motor 15 is provided, and its shaft 16 carries a head 17, which is secured on the shaft by the screws 18. This head 17 is formed with sockets or openings 19, which receive shanks 20 of cutting tools 21, screws 22 adapted for holding the shanks in the openings. Certain of the openings 19 are differently positioned than certain others, so as to hold the cutting or surfacing tools in different positions, and in this case screws 23 are used to secure the shanks in place.

Depending from the base 24 of the motor are guide pieces 25 having angle guides 26. In other words the guide pieces are inverted L-shaped, to engage with the opposite tracks 6. To hold the angle guides engaged with the tracks, clamping plates 27 are secured to the guide pieces 25 by means of screws 28, there being wear plates 29 disposed over and engaged with the under surfaces of the pieces 3 and 4 of the frame.

The motor has the usual current conducting cord 30 attached to the motor, for the purpose of connecting the armature (not shown) of the motor in an electric circuit, the handle 31 of the motor adapted to carry any conventional type of switch or circuit closure (not shown), for closing or shutting the circuit, there being suitable push buttons 32 for operating the switch.

As the plate or arm 1 oscillates over the material to be surfaced and since the frame 2 is carried by the arm or plate, the operator may easily operate the motor back and forth over the guides and thereby surface the material.

In Figure 4 the frame 2 has its transverse bars or pieces 7 mounted in guide grooves 7a of the tracks or rails 7b, which may rest on the material, the face of which is being surfaced. It is obvious that the frame 2 may be reciprocated in the guide grooves, while the motor may be reciprocated at right angles to the movement of the frame 2.

The invention having been set forth, what is claimed is:

In a wood surfacing machine attachment, the combination with a frame comprising two end pieces which may be adapted as supports, a pair of longitudinal pieces connecting the end pieces and having certain of their longitudinal edges spaced in parallelism and constituting parallel guide tracks, a guard rail secured on one edge of one of said longitudinal pieces, a pair of clamps carried by the upper surface of the other longitudinal piece and being oppositely opposed and which may be adapted for supporting the frame on a movable member when the end pieces are not used as supports, of a motor provided with downwardly projecting guide pieces to engage said guide tracks, clamping plates secured to the downwardly projecting guide pieces and engaging the under surfaces of the longitudinal pieces for supporting the motor in guiding relation to the guide tracks, the shaft of the motor having a tool carrying head, and a tool mounted on the head.

In testimony whereof he affixes his signature.

GABRIEL DZAMAN.